Oct. 5, 1965

H. O. HOUSER 3,209,493

DRILL POINTING MACHINE

Filed Aug. 19, 1963

Harold O. Houser,
INVENTOR.

By Forrest J. Lilly
ATTORNEY.

Oct. 5, 1965  H. O. HOUSER  3,209,493
DRILL POINTING MACHINE
Filed Aug. 19, 1963

INVENTOR.
HAROLD O. HOUSER,
By James Hill
ATTORNEY.

Oct. 5, 1965 H. O. HOUSER 3,209,493
DRILL POINTING MACHINE
Filed Aug. 19, 1963 9 Sheets-Sheet 8

HAROLD O. HOUSER,
INVENTOR.
By Forrest J. Lilly
ATTORNEY.

Oct. 5, 1965

H. O. HOUSER

3,209,493

DRILL POINTING MACHINE

Filed Aug. 19, 1963

HAROLD O. HOUSER,
INVENTOR.

By Forrest J. Lilly
ATTORNEY.

United States Patent Office 3,209,493
Patented Oct. 5, 1965

3,209,493
DRILL POINTING MACHINE
Harold O. Houser, El Monte, Calif., assignor to Winslow Product Engineering Corporation, Arcadia, Calif., a corporation of California
Filed Aug. 19, 1963, Ser. No. 302,879
24 Claims. (Cl. 51—94)

This invention relates generally to drill grinding machines and particularly to an improved drill pointing machine.

Patent No. 3,040,480 discloses a drill pointing machine wherein a drill to be pointed is gripped in a rotary chuck or collet which is simutaneously oscillated toward and away from a grinding wheel and reciprocated along the axis of oscillation while the drill is rotated on its central axis. As a result of these combined movements of the drill collet, the rotating drill is caused to undergo a compound translational motion involving axial motion of the drill tip toward and into contact with the grinding surface of the wheel and simultaneous lateral motion of the drill tip across the grinding surface toward and finally across a bounding edge of the surface. Such drill motion is cyclic and is repeated for each land of the drill in succession until a finished drill point is obtained. This grinding motion generates a generally helical tip surface on each land of the drill and undercuts each helical land surface slightly adjacent the drill axis. The resulting drill point is commonly referred to as a helical drill point.

Copending application Serial No. 161,175 filed December 21, 1961, now abandoned, and refiled as continuation application Serial No. 301,697 on August 5, 1963, and entitled Machine for Grinding Conical Drill Points discloses certain improvements in the drill pointing machine of the patent just discussed. According to these improvements, the drill holder is afforded with an additional motion, namely, a rocking motion on an axis transverse to the oscillation axis of the holder. This rocking motion progressively changes the angle of the drill axis relative to the grinding surface during the grinding cycle for each drill land in such a way as to generate a generally conical tip surface on each land of the drill. The resulting drill point is commonly referred to as a conical drill point. In the latter machine, the rocking motion of the drill holder may be locked out so that either helical or conical drill points may be ground.

It is a general object of the present invention to provide further improvements on the prior drill pointing machines discussed above.

A more specific object of the invention is to provide a drill pointing machine of the kind described which is characterized by its greater simplicity of construction, economy of manufacture, and improved method of generating the compound drill motions required to produce helical and conical drill points.

Another object of the invention is to provide a drill pointing machine of the kind described which embodies a unique loading jig for loading and properly orienting a drill in the drill holder of the machine.

A further object of the invention is to provide a drill pointing machine of the kind described which embodies a unique grinding wheel dresser.

Other objects, advantages, and features of the invention will become readily apparent as the description proceeds.

Briefly, the objects of the invention are attained by providing a drill pointing machine equipped with a main frame mounting a rotary grinding wheel and a drill holder which rotatably supports a drill to be pointed for turning on its longitudinal axis. This holder is mounted on the frame for oscillation about and reciprocation along an axis transverse to and laterally offset from the drill axis. The grinding wheel is so located relative to the drill holder that combined oscillation and reciprocation of the holder and rotation of the drill in the holder is effective to move the drill tip through a cyclic compound grinding motion relative to a peripheral grinding surface on the grinding wheel. During this grinding motion, the rotating drill tip undergoes successive passes across the grinding surface toward and finally across a coaxial grinding edge on the wheel. The tip surfaces of the drill lands are ground in succession during successive passes of the drill tip across the grinding surface.

The drill holder is also mounted for rocking motion about an effective axis transverse to the oscillation axis of the holder and the rotation axis of the drill. Rocking motion of the holder about this effective axis occurs in timed relation to oscillation and reciprocation of the holder and varies the angle of the drill axis relative to the grinding surface during each pass of the drill tip across the grinding surface in such manner as to generate a conical point on the drill. Rocking motion of the holder about its effective axis can be locked out when desired to permit grinding helical drill points.

In the illustrative embodiment of the invention, the drill holder is carried on a supporting column which is mounted for oscillation and reciprocation on the main frame of the machine. An important feature of the invention resides in the fact that the drive means for oscillating, reciprocating, and rocking the drill holder and rotating the drill in the holder are carried on this supporting column, whereby the present drill pointing machine has greater simplicity of construction and is more economical to manufacture than the drill pointing machines of the aforementioned patent and application.

Another important feature of the invention resides in the unique manner in which the various drill movements involved in the above-described compound grinding motion of the drill are generated as well as adjusted to vary the tip angle, relief angle, and other drill point parameters.

Other important features of the invention are concerned with a unique drill loading for initially properly locating a drill to be pointed in the drill holder and with a unique grinding wheel dressing means for dressing the wheel according to the particular type of drill point to be ground.

A better understanding of the invention may be had from the following detailed description, taken in connection with the attached drawings, wherein:

FIGS. 15a, 15b and 15c are side views of three cams embodied in the machine;

FIG. 16 is a perspective of a portion of the upper end of the machine in FIG. 1 with a hinged cover shown in open position to expose the grinding wheel therebelow;

Figures 1, 1A, 1B:
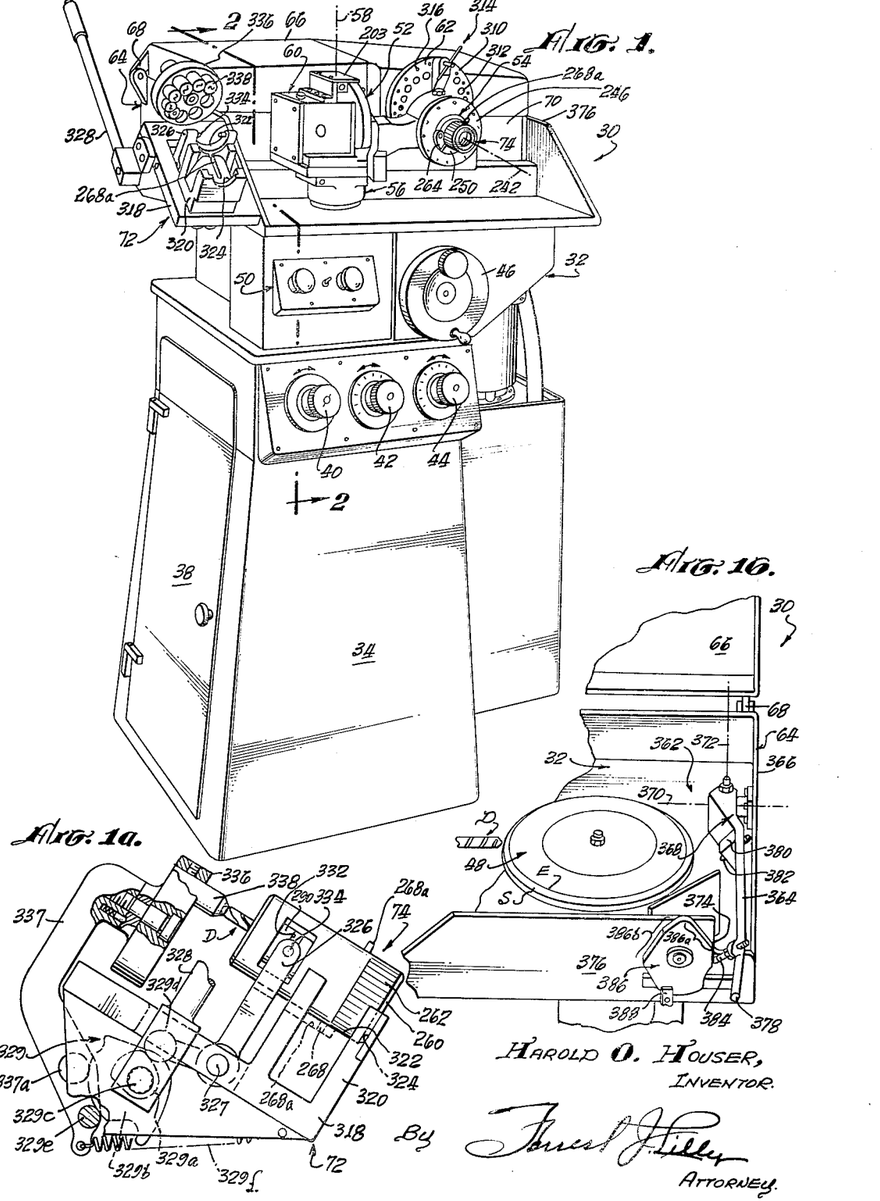
FIG. 1 is a perspective view of a drill pointing machine according to the invention.
FIG. 1a is an enlarged view of the drill loading jig embodied in the machine.

Referring first to FIGS. 1 and 16 of these drawings, the illustrated drill pointing machine 30 will be seen to comprise a main supporting frame 32 including a lower, hollow supporting base 34 and an upper table or platform 36. At the left of the base 34 is a door 38 which may be opened to provide access to certain mechanism contained within the base. Accessible at the front side of the base are three knobs 40, 42 and 44 by which the grinding motions of the machine are adjusted. Also accessible at the front side of the base is a handwheel 46 for adjusting the grinding wheel of the machine, which is shown at 48 in FIG. 16. A small panel to the left of this handwheel mounts controls 50 for starting and stopping the machine.

Visible above the frame platform 36 in FIG. 1 is the upper end of a drill support 52. This support includes a holder 54 for the drill to be pointed, a vertical supporting column 56 which mounts the drill holder 54 on the machine frame 32 for oscillation about and reciprocation along a vertical axis 58, and a transmission 60 at the upper end of the column which contains mechanism for transmitting certain motions to the drill holder 54. Also mounted on the drill support 52 is a rotary, turret-type bushing plate 62 which cooperates with the drill holder 54 to accurately and firmly position the drill to be pointed. Immediately behind the drill support 52, as the latter is viewed in FIG. 1, is an enclosure 64 containing the grinding wheel 48. This enclosure has a cover 66 which is hinged at 68 so that it may be opened, as shown in FIG. 16, to expose the grinding wheel. Enclosure 64 has a front wall opening 70 through which the drill D (FIG. 16) to be pointed extends for contact with the grinding wheel.

Mounted on the platform 36, to the left of the drill support 52, is a loading jig 72 which aids in locating a drill to be pointed in proper position in the drill holder 54. This jig is designed to receive a drill collet 74 which is insertable into the rear end of the drill holder and which grips the shank of the drill to be pointed, as may be best observed in FIG. 8.

Figure 3:
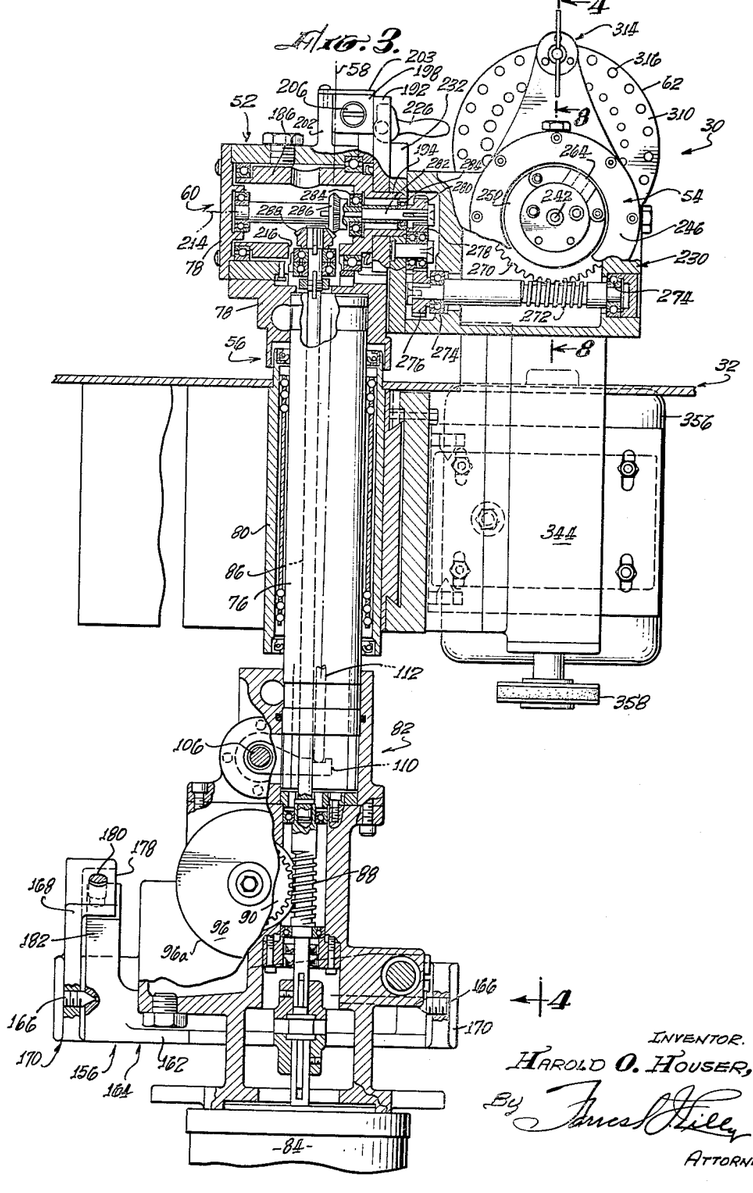
FIG. 3 is a section taken on line 3—3 in FIG. 2 with parts broken away and shown in section for the sake of clarity.

The drill support 52 and certain driving mechanism associated therewith will now be described in detail. Referring first to FIG. 3, it will be observed that the supporting column 56 of the drill support 52 includes a hollow, tubular shaft 76, the upper end of which fits in a downwardly opening bore in and is rigidly fixed to the housing 78 of the transmission 60. Shaft 76 extends through a vertically oriented ball sleeve bearing 80 fixedly mounted on the machine frame 32. The axis of this sleeve bearing coincides with the axis 58 of oscillation and reciprocation of the drill support 52. Sleeve bearing 80, then, mounts the drill support 52 on the frame 32 for oscillation about and reciprocation along the axis 58.

Figure 4:
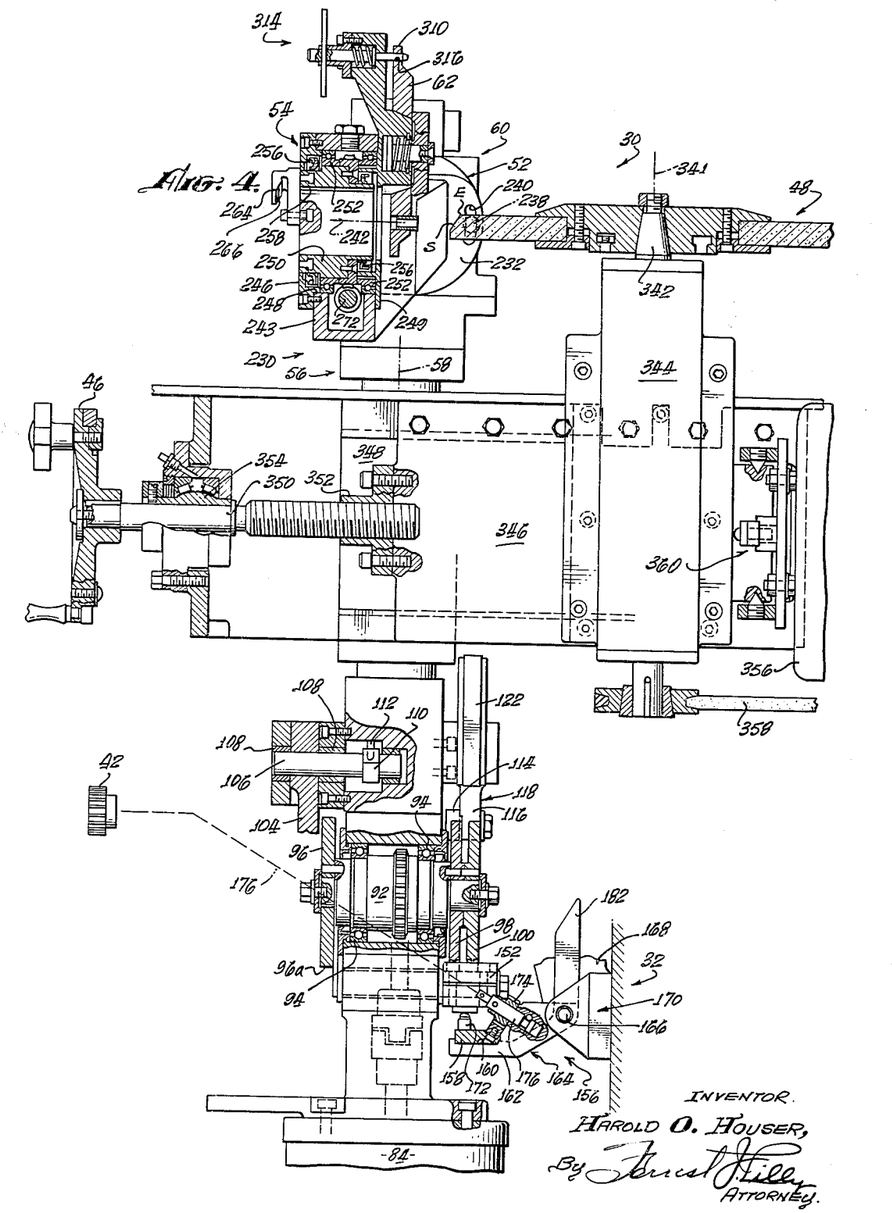
FIG. 4 is a section taken on line 4—4 in FIG. 3 with parts broken away and shown in section for the sake of clarity.

Fixed to the lower end of the shaft 76, below the bearing 80, is a housing 82, to the lower face of which is bolted a motor 84. Motor 84 drives a shaft 86 which extends upwardly through the shaft 76 into the transmission housing 78 and is rotatably supported at intervals by the ball bearing units illustrated. As will be seen shortly, shaft 86 drives the drill D in rotation. Within the drill support housing 82 is a worm 88 on shaft 86 which meshes with a worm wheel 90 also located within the housing 82. Referring to FIG. 4, it will be observed that worm wheel 90 is integrally formed on a relatively large diameter hub 92, the ends of which protrude through openings in the wall of the housing 82 and are rotatably supported on the latter by ball bearing units 94. The axis of rotation of the worm wheel 90 is horizontal, as shown.

Figures 5, 6:
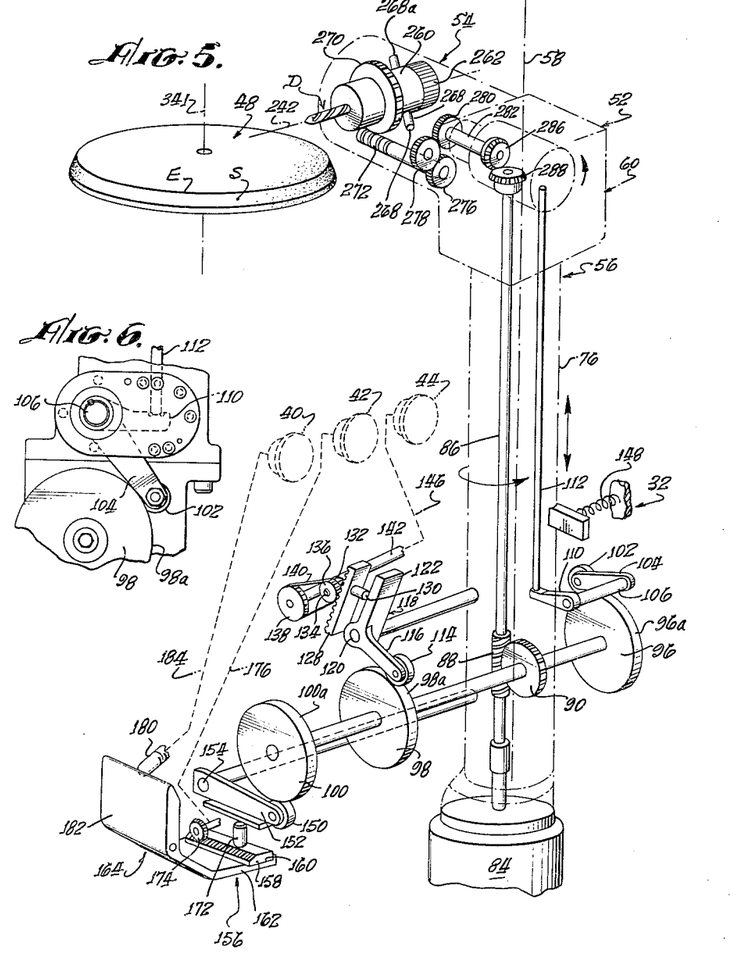
FIG. 5 is a diagrammatic perspective view of certain parts of the machine.
FIG. 6 is an enlarged view looking in the direction of the arrows on line 6—6 in FIG. 2.

Fixed to the left-hand protruding end of the worm wheel hub 92 in FIG. 4 is a first cam 96. Fixed to the right-hand protruding end of the hub are second and third cams 98 and 100. It is evident that cams 96, 98 and 100 are rotated in unison by the motor 84. For additional views of these cams, see FIGS. 2, 5, 6 and 7. For the profiles of the cams, see FIGS. 15a, 15b and 15c. Referring to FIGS. 4–6, it will be observed that the peripheral cam surface 96a of cam 96 is engaged by a cam follower roller 102 carried by one end of an arm 104. The opposite end of this arm is keyed to a shaft 106. Shaft 106 is rotatably supported in bearings 108 on the drill support housing 82 for turning on an axis parallel to the common axis of the cams 96, 98, 100 and projects to the interior of the housing 82. Fixed to the inner end of shaft 106 is an arm 110 on which seats the lower end of a push rod 112. Push rod 112 extends upwardly through the tubular shaft 76 of the drill support 52 into the transmission housing 78 on the upper end of the shaft, as shown best in FIG. 12, and serves to impart a rocking motion to the drill holder 54, as will be explained later. At this point it is evident, however, that if we assume the push rod 112 to be spring loaded in the downward direction, rotation of cam 96 is effective to impart a reciprocating motion to the push rod.

Referring to FIGS. 2, 4, 5 and 7, it will be observed that the peripheral cam surface 98a of cam 98 is engaged by a cam follower roller 114 carried on the end of one arm 116 of a bell crank 118. Bell crank 118 is pivoted at 120 on the lower drill support housing 82 on an axis parallel to the common axis of the cams 96, 98, 100. The other arm 122 of the bell crank 118 extends in a generally upward direction.

Figures 2, 7, 7A:
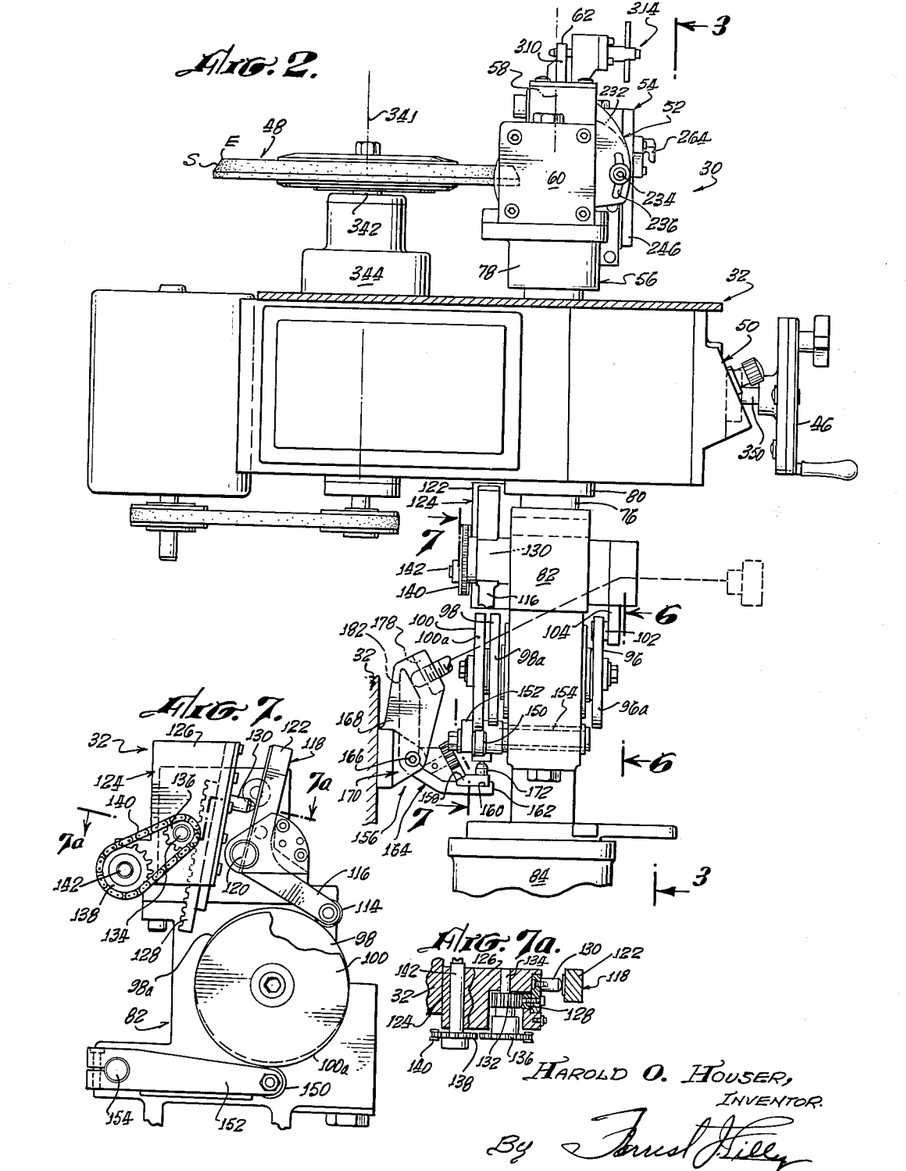
FIG. 2 is an enlarged section taken on line 2—2 in FIG. 1.
FIG. 7 is an enlarged section taken on line 7—7 in FIG. 2.
FIG. 7a is an enlarged section taken on line 7a—7a in FIG. 7.

Behind the bell crank 118, as it is viewed in FIG. 2, and to the left of the bell crank, as it is viewed in FIG. 7, is a movable fulcrum means 124. This means comprises a housing 126 which is mounted on the main frame 32 of the machine, as shown, and slidably mounts therein a rack 128. Rack 128 moves in the plane of rotation of the bell crank 118 and along a direction line inclined slightly from the vertical, that is, from the axis 58 of the drill support column 56. Carried by the rack 128 is a fulcrum or pin 130 which projects through a slot (FIG. 7a) in the side of the movable fulcrum housing 126 which faces the bell crank 118. Bell crank arm 122 seats against the outer end of fulcrum 130. A pinion 132 (FIG. 7a) within the housing 126 meshes with the rack and is keyed to a shaft 134 which is rotatably supported by and extends to the outside of the latter housing. Keyed on the external end of this shaft is a sprocket 136 around which and a second sprocket 138 is trained a sprocket chain 140. Sprocket 138 is keyed on a shaft 142. As diagrammatically illustrated in FIG. 5, shaft 142 is coupled to one of the adjustment knobs, i.e., knob 44, on the front side of the machine base by a drive connection indicated at 146, whereby shaft 142 is rotatable to adjust the rack 128 up or down in FIG. 7 by rotation of knob 44.

It is evident from the preceding description that as the high point of cam 98 (see FIG. 15b) approaches cam roller 114 during rotation of the cam by motor 84, the bell crank 118 pivots in a counterclockwise direction in FIG. 7, thereby urging its arm 122 against the fixed fulcrum 130. This thrust of the bell crank arm against the fulcrum creates a torque on the drill support 52 which rotates the latter about its axis 58 in the direction indicated by the lower curved arrow in FIG. 5. Indicated at 148 is a spring which acts between the machine frame 32 and the drill support 52 for urging the latter in the opposite direction about the axis 58. Accordingly, rotation of cam 98 by motor 84 is effective to oscillate the drill support 52 about its axis 58. Adjustment of the fulcrum 130 along the bell crank arm 122, by adjustment of its rack 128, varies the oscillatory stroke of the drill support. In other words, downward adjustment of the fulcrum in FIG. 7 decreases the stroke while upward adjustment of the fulcrum increases the stroke. Thus, the oscillatory stroke of the drill support is adjustable by the knob 44 on the front of the machine.

Referring nows to FIGS. 2, 4, 5 and 7, it will be observed that the peripheral cam surface 100a of cam 100 is engaged by a cam follower roller 150 carried on one end of an arm 152. The opposite end of this arm is fixed to a shaft 154 which parallels the common axis of the cams 96, 98, 100 and is rotatably supported in the lower drill support housing 82. Cam follower arm 152 cooperates with a second adjustable fulcrum means 156 to reciprocate the drill support 52 along its axis 58. Fulcrum means 156 comprises a rack 158 which is slidably supported in a guideway 160 formed in one arm 162 of a bell-crank-like, channel-shaped member 164 which is elongated in the direction of its pivot axis. Bell crank 164 is pivoted at 166 between the arms 168 of a bracket 170 which is rigidly attached to the machine frame 32. The pivot axis of this bell crank is normal to the axis of the cams 96, 98, 100, and the rack 158 is movable in a direction parallel to the latter pivot axis. Rack 158 carries a pin or fulcrum 172 on which the cam follower arm 152 seats.

Rotatably supported on the arm 162 of the bell crank 164 is a pinion 174 which meshes with the rack 158. Rotation of the pinion is thus effective to shift the rack endwise and thereby adjust the position of fulcrum 172 along the cam follower arm 152. As diagrammatically illustrated in FIGS. 4 and 5, pinion 174 is connected to the knob 42 on the front side of the machine through a drive connection 176. Thus, rack 158 may be adjusted by turning the knob 42. It is evident that during rotation of cam 100 by motor 84, as the high point of the cam (see FIG. 15a) approaches the cam roller 150, the thrust of the roller arm 152 against the fulcrum 172 reacts on the drill support 52 to raise the latter in the direction of its axis 58. As the high point of the cam 100 recedes from the roller 150 during continued rotation of the cam past the high point, the drill support descends under the force of gravity. Thus, rotation of cam 100 is effective to reciprocate the drill support 52 along its axis 58. The weight of the drill support may be counterbalanced, as by a spring (not shown). Adjustment of the fulcrum 172 along the cam follower arm 152 obviously varies the reciprocatory stroke of the drill support. In other words, adjustment of the fulcrum to the right in FIG. 5 increases the latter stroke, while adjustment of the fulcrum to the left decreases the stroke.

The fulcrum means 156 embodies yet a further adjustment, as follows: The arms 168 of the supporting bracket 170 for bell crank 164 are bridged by a crossmember 178. Threaded in this crossmember is an adjusting screw 180 which seats against the other arm 182 of the bell crank 164. Screw 180 is connected to the third knob 40 on the front of the machine through a drive connection 184 shown in FIGS. 2 and 5. Adjustment of screw 180 is effective to independently adjust the vertical position of the drill support. For example, if the screw 80 is advanced toward the arm 182 of the bell crank 164, the latter is rotated on its pivots 166 in a direction to raise the fulcrum 172 and, thereby, the entire drill support 52. Similarly, if the screw 180 is backed away from the arm 182 of the bell crank 164, the latter rotates in the opposite direction on its pivots, under the weight of the drill support, thereby lowering the fulcrum 172 and the entire drill support. The reciprocatory stroke of the drill support, of course, is determined solely by the position of the fulcrum 172 and is not affected by the above adjustment.

It is evident from the description thus far that when the motor 84 is energized, the three cams 96, 98 and 100 are driven in rotation, thereby reciprocating the push rod 112 and synchronously oscillating and reciprocating the drill support 52 on its axis 58. The motor, cams and cam followers are carried directly by the drill support and thus undergo oscillation and reciprocation with the drill support. The oscillatory and reciprocatory strokes of the drill support are adjustable by the knobs 42 and 44 on the front of the machine.

Figures 12, 13, 14, 15:
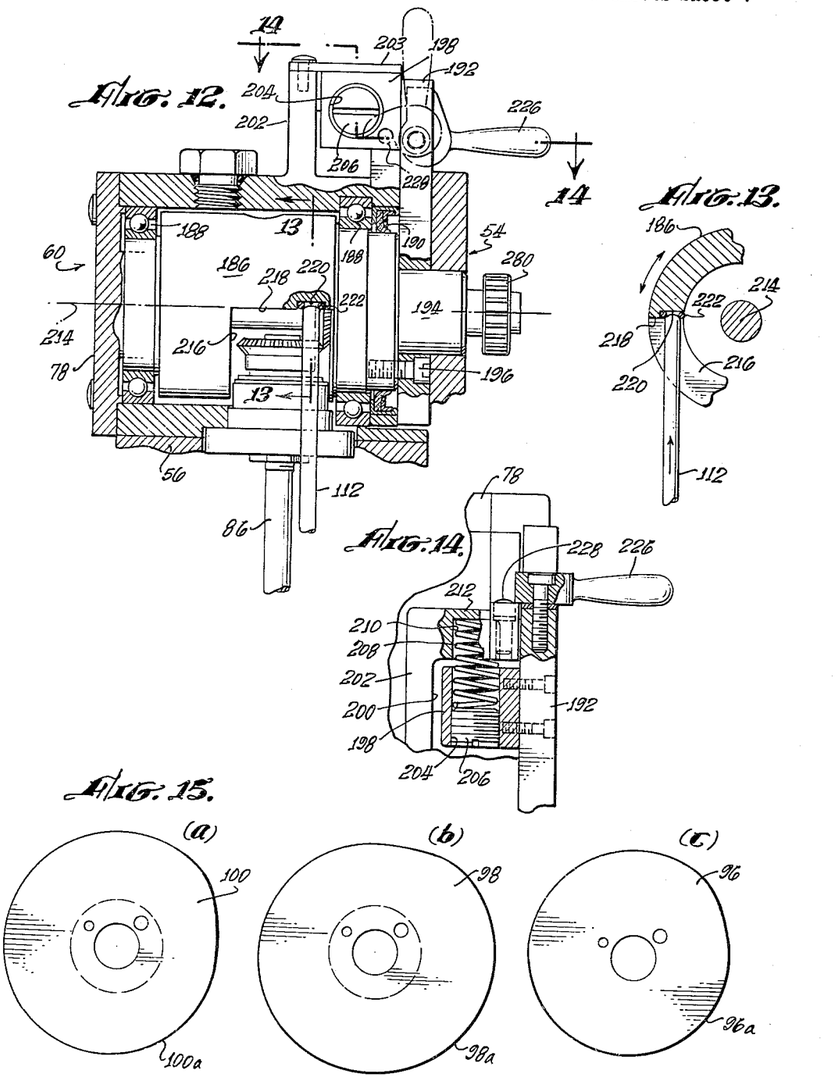
FIG. 12 is an enlarged vertical section through a certain transmission housing located at the upper end of the supporting column which mounts the drill holder on the main frame of the machine.
FIG. 13 is a section taken on line 13—13 in FIG. 12.
FIG. 14 is a section taken on line 14—14 in FIG. 12.

Referring now to FIG. 12, it will be observed that the transmission housing 78 on the upper end of the drill support column 56 encloses a hollow, cylindrical rock arbor 186, the ends of which are supported in the housing by combined radial and thrust bearings 188. The right-hand end of the arbor is reduced in diameter and projects through the right-hand side of the housing 78 which is open, as shown. A dirt and grease seal 190 is placed between the arbor and housing in the open side of the latter. Slidably seating against the right-hand face of the transmission housing 78 is a plate 192 which is apertured to slidably fit over the reduced, protruding end 194 of the rock arbor 186. Plate 192 is attached to the rock arbor by bolts 196 (only one shown). Bolted to the left-hand face of the plate 192, as the latter is viewed in FIGS. 13 and 14, is a boss 198 which projects into a cavity 200 formed in an upstanding enclosure 202 on the transmission housing 78. The upper side of this cavity is closed by a cover plate 203. Extending through the boss 198 is a threaded bore 204 containing a set screw 206. One end of a compression spring 208 is received in the bore 204 and seats against the set screw 206. The opposite end of the spring 208 seats in a bore or socket 210 extending into the inner surface of a wall 212 of the spring enclosure 202. It is evident, therefore, that the spring 208 urges the plate 192, and thereby also the rock arbor 186, in one direction about the rotation axis 214 of the arbor in the transmission housing 78.

In FIGS. 12 and 13 it will be observed that a portion of the lower half of the rock arbor 186 is cut away at 216. One longitudinal edge face 218 of this cutaway is formed with a circular recess 220 containing a hardened ring 222. The upper end of the push rod 112 is spherically rounded and seats against this ring, which has a slightly smaller internal diameter than the diameter of the push rod. It is evident from the drawings that the spring 208 urges the rock arbor 186 in a direction such that the ring 222 presses down on the push rod. Recalling that the cam 96, when driven by motor 84, operates to periodically raise the push rod, it is obvious that during such rotation of the cam 96, the push rod is axially reciprocated while the rock arbor 186 and plate 192 are oscillated on their axis 214.

As will be seen later, this rocking motion of the arbor and plate is utilized only when grinding conical drill points. When grinding helical drill points, it is necessary to lock out the rocking motion. To this end, there is mounted on the plate 192 a drill holder lock lever 226 which, in its solid line positions of FIGS. 12 and 14, is released to permit free rocking motion of the arbor and plate. When the lever is rotated to its dotted line position of FIG. 12, it rides over a hardened pin 228 press fitted in the spring enclosure wall 212. This retracts the rock arbor 186 slightly against the action of spring 208 to a position wherein the clearance between the upper end of the push rod and its ring seat 222 is slightly greater than the travel imparted to the rod by its cam 96. In this locking position of the lever 226, therefore, the rock arbor and plate 192 are locked in a fixed angular position with respect to the transmission housing 78. The push rod 112, of course, remains free for axial movement by its cam 96.

Referring now to FIGS. 1, 2, 3, 4, 8 and 12, the drill holder 54 will be observed to comprise a housing 230, rigid on the left-hand end of which, as the housing is viewed in FIGS. 1 and 3, is a plate 232. As may be best observed in FIGS. 3 and 12, this plate is apertured to rotatably fit on the protruding end 194 of the rock arbor 186. Drill holder plate 232 slidably seats against the rock arbor plate 192 and is adjustably secured to the latter plate by a screw 234 (FIG. 2) which extends through a curved slot 236 in the arbor plate 192 and is threaded in the drill holder plate 232 and a screw 238 (FIG. 4) which extends through a curved slot 240 in the drill holder plate 232 and is threaded in the arbor plate 192. The drill holder 54, therefore, can be angularly adjusted relative to the rock arbor 186, about the axis 214 of the latter, by loosening the screws 234, 238 and then locked in adjusted position by retightening the screws. It is evident from the above description that the drill holder 54 rocks or oscillates with the rock arbor 186, about the axis 214, when the lever 226 is released.

Figures 8, 11B:
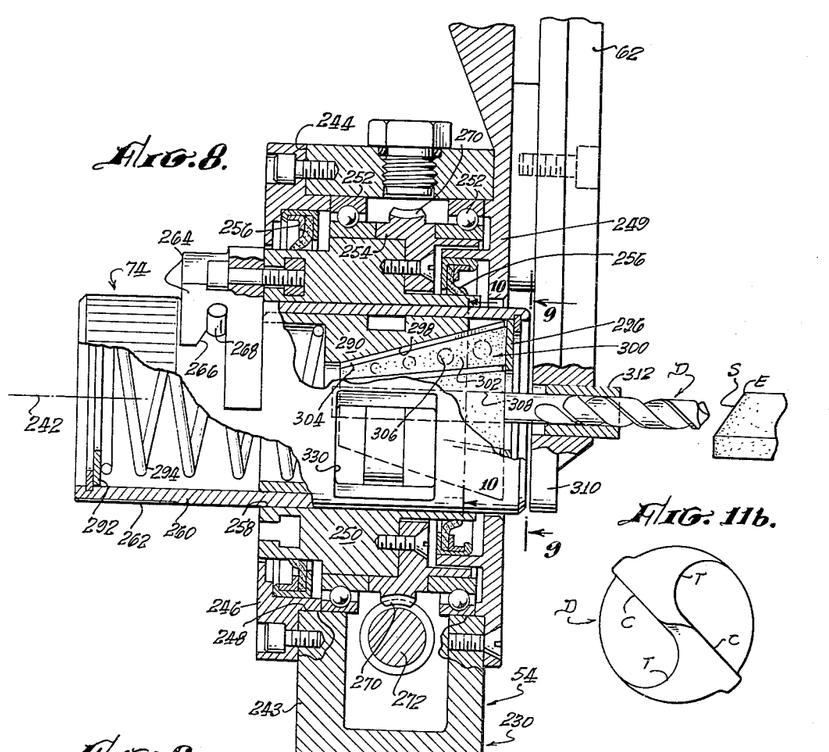
FIG. 8 is an enlarged section taken on line 8—8 in FIG. 3.
FIG. 11b is an end view of the tip of a helically pointed drill which has been ground on the present machine.
Figures 9, 11A:
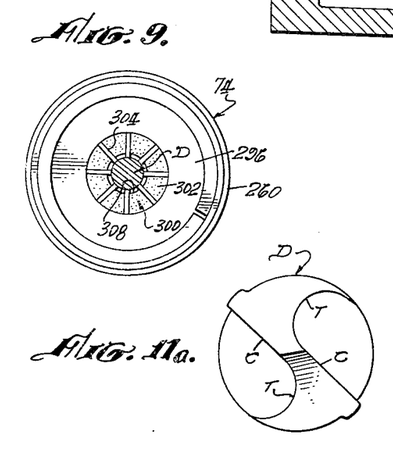
FIG. 9 is a section taken on line 9—9 in FIG. 8.
FIG. 11a is an end view of the tip of a conically pointed drill which has been ground on the present machine.

Continuing now with the description of the drill holder 54, the housing 230 of the holder is generally rectangular in outline, when viewed from the rear as in FIG. 3, except that the right-hand end of the housing has an upper, generally cylindrical curvature which is centered on an axis 242 of the holder. Axis 242 is normal to and intersects the rocking axis 214 of the rock arbor 186 and drill holder 54. As will be seen shortly, the drill D to be pointed is positioned so that its axis coincides with the axis 242. On the rear wall 243 of the drill holder housing 230, that is, the left-hand side of the housing as it is viewed in FIG. 8, is an annular seating face 244 concentric with and disposed in a plane normal to the axis 242. Seating against and bolted to this face is a rear annular retainer plate 246. Retainer plate 246 partially overlies and has a coaxial cylindrical lip fitted in a circular opening 248 in the housing 230. Opening 248 is centered on the axis 242 and continues through the housing 230 to open through its forward side, that is, the right-hand side of the housing as the latter is viewed in FIG. 8. Bolted to the forward side of the housing 230 and partially overlying the forward end of the housing opening 248 is a forward annular retainer plate 249 having a cylindrical lip which fits in the opening.

Coaxially positioned in the opening 248 in the drill holder housing 230 is a generally tubular collet holder 250. This collet holder is rotatably supported in the housing by ball bearing units 252, the outer races of which abut the cylindrical lips on the retainer plates 246, 249. Between the bearings 252, the collet holder 250 is formed with a peripheral flange 254 which engages the inner races of the bearings 252. This flange provides a thrust shoulder on the holder, whereby the bearings serve as combined radial and thrust bearings for the holder. Dirt and grease seals 256 are placed, a shown, to seal the interior of the drill holder housing 230.

Extending coaxially through the collet holder 250 is a bore 258 for receiving the collet 74, which will be described shortly. At this point, however, it is to be noted that the collet comprises a sleeve body 260 which is proportioned to have a slip fit in the collet holder bore 258. The length of the collet is such that when the latter is inserted in the collet holder 250, the forward end of the collet protrudes a short distance beyond the forward side of the drill holder housing 230 and the rear end of the collet protrudes a substantial distance beyond the rear side of the housing. The rear end of the collet body 260 is knurled at 262 so that it may be easily gripped for insertion and wtihdrawal. For reasons which will become apparent shortly, it is necessary to locate the collet 74 in a predetermined axial and angular position in the collet holder 250. To this end, there is bolted to the rear face of the collet holder a collet locating block 264 which is formed with a circumferentially opening locating slot 266. The body 260 of the collet 74 carries a locating pin 268 which is adapted to fit in the locating slot 266, in the manner shown in FIG. 8, thereby to locate the collet both angularly and axially relative to the collet holder. It is obvious from the drawings that the collet is removed from the collet holder by rotating the collet to disengage its locating pin 268 from the locking slot 266 and then axially withdrawing the collet from the holder. The collet is inserted into the holder by reversing these steps.

Formed about the flange 254 on the collet holder are worm teeth 270. These worm teeth mesh with a worm 272 which extends through the drill holder housing 230 a distance below and parallel to the rocking axis 214 of the drill holder. As shown best in FIG. 3, worm 272 is rotatably supported at its ends on the housing 230 by means of ball bearings 274. Keyed on the left-hand end of the worm shaft, as it is viewed in FIG. 3, is a pinion 276 which meshes with an idler pinion 278 rotatably supported on the drill holder housing end plate 232. Idler 278, in turn, meshes with a pinion 280 which is keyed on one end to a stub shaft 282. This latter shaft extends coaxially through and is rotatably supported by bearings 284 in the protruding end 194 of the rock arbor 186. Keyed on that end of the shaft 282 which is located within the interior of the rock arbor is a bevel gear 286 which meshes with a bevel gear 288 keyed on the upper end of the drive shaft 86. The collet holder 250 and the collet 74 therein are thus driven in rotation from the drive shaft 86.

At this point, then, it is obvious that when the motor 84 is energized to drive the cams 96, 98, 100 and the drive shaft 86 in rotation, the drill holder 54 is simultaneously reciprocated along and oscillated about the vertical axis 58. The collet holder 250 and collet 74 therein are rotated in timed relation to this combined oscillation and reciprocation of the drill holder. Finally, if the lock lever 226 for the drill holder is rotated to its solid line released or retracted position of FIG. 12, the drill holder 54 is also rocked or oscillated about the horizontal axis 214 in timed relation to reciprocation and oscillation of the drill holder on the vertical axis 58.

These simultaneous and timed movements of the drill holder serve to impart a compound grinding motion to the drill D to be pointed, which drill is held in the collet 74, in the manner now to be described.

Figure 10:
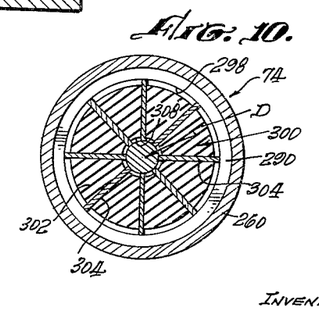
FIG. 10 is a section taken on line 10—10 in FIG. 8.

Referring again to FIG. 8, it will be observed that within the body 260 of the collet 74 is slidably positioned a collet sleeve 290. Acting between the rear or lefthand face of this collet sleeve and a snap-ring-backed washer 292 in the rear end of the collet body is a compression spring 294 which urges the collet sleeve forwardly in the collet body toward a snap-ring-backed washer 296 in the forward end of the body. Formed in and opening through the forward end of the collet sleeve 290 is a forwardly diverging, conical bore 298 in which is positioned a collet assemlby 300. Referring to FIG. 10, the collet assembly 300 comprises a molded, resilient, conical body 302 composed of rubber or other suitable resilient material. Contained within this body are a series of radially disposed, flat blade-like collet jaw inserts 304. These collet jaw inserts are fixed directly to the resilient collet body 302, as by molding the latter about the inserts and providing the latter with openings 306 (FIG. 8) through which the body material flows during the molding process.

As may be best observed in FIG. 10, the resilient collet body 302 is slightly smaller in diameter than the conical bore 298 in the collet sleeve 290 so that the outer surface of the body is radially spaced from the wall of the bore. The outer edges of the collet jaw inserts 304 are tapered at the same angle as the resilient collet body and conical bore and protrude beyond the outer surface of the resilient body for contact with the wall of the bore. Extending coaxially through the resilient collet body 302 is a circular opening 308 which is adapted to receive the drill D to be pointed. In practice, several collets 74, containing resilient collet bodies 302 with different sized openings 308 for different sized drills, will be provided with each machine. The central collet body opening 308 will be seen to be somewhat larger in diameter than the drill D it is adapted to receive. The inner edges of the collet jaw inserts 304 extend parallel to the axis of the body opening 308 and project inwardly of the wall of the opening, as shown, for contact with the drill D.

In FIG. 8, the axial length of the collet assembly 300 will be seen to be somewhat greater than the axial depth of the conical bore 298 in the collet sleeve 290. Thus, the forward end of the collet assembly protrudes forwardly of the collet sleeve and is urged against the forward collet washer 296 by the collet spring 294. Accordingly, the collet spring acts to force the collet sleeve 290 over the collet assembly 300, whereby the conical wall of the bore in the sleeve cams the jaw inserts 304 of the assembly radially inward to grip the drill D. The resiliency of the collet body 302, of course, permits this inward movement of the jaw inserts. The manner in which the drill is released from and positioned in the collet assembly will be described shortly.

In order to grind an accurate drill point, it is necessary to accurately position the drill tip and to rotate the latter about its own axis. This is accomplished as follows: Rotatably mounted on the forward side of the drill holder 54 is the drill bushing turret plate 62 in which are mounted a series of fixed drill bushings 312 of different diameters. These bushings are mounted at a common radial distance from the turning axis of the turret plate such that each bushing may be rotated to the position of FIG. 8 wherein the bushing axis coincides with the rotation axis of the collet holder 250 and collet 74. A spring-loaded indexing pin 314 (FIG. 3) is carried by the drill holder 54 for selective engagement in indexing holes 316 in the turret plate 62 to index the latter to its different aligned positions. A drill in position in the collet, then, is rotatably supported adjacent its tip by the currently aligned drill bushing 312, in the manner shown in FIG. 8.

The drill D is inserted into and removed from the collet 74 by operation of the jig 72 illustrated in FIGS. 1 and 1a. This jig comprises a base plate 318 which is fastened to the machine frame 32. On this base plate is fixed a collet holder 320 which comprises simply a metal block having a cylindrically curved recess 322 in its upper side which is proportioned to receive the collet. At one end of this recess is a shoulder 324 against which the rear end of the collet body 260 is adapted to seat. Opposite the other end of the collet holder 320 is a yoke 326 which is hinged at 327 on the plate 318 for swinging toward and away from the holder, the yoke being thus moved by a pivoted handle 328 which operates the yoke through a cam mechanism 329. The arms of the yoke 326 straddle the forward end of the collet 74 when the latter is seated in the holder 320.

Referring for the moment to FIG. 8, it will be observed that the collet body 260 has two diametrically opposed openings 330 (only one shown). The collet sleeve 290 has an external peripheral groove 332 which is exposed through the body openings 330. The arms of the movable yoke 326 carry inwardly projecting lugs or pins 334 which etxend through openings 330 and engage in the groove 332 in the collet sleeve 290. After thus positioning the collet 74 in the jig 72, the handle 328 is swung in a direction to swing the yoke 326 toward the collet holder 320. This movement of the yoke forces the collet sleeve 290 rearwardly in the collet body 260, against the action of the collet spring 294, thereby relieving the radial contracting pressure of the sleeve on the collet assembly 300. A drill may then be removed from or inserted into the assembly.

It is necessary to locate each drill to be pointed in a predetermined angular and axial position in the collet 74. To this end, a drill locator turret 336 is rotatably mounted on an arm 337 for turning on an axis displaced from the axis of curvature of the collet holder recess 322 and mounts a series of drill locators 338 at a uniform radial distance from the turning axis of the turret such that each locator may be aligned with the axis of recess 322 (which corresponds to the axis of a drill positioned in the jig). Arm 337 is hinged at 337a to the base plate 318. Handle 328 swings arm 337 through cam mechanism 329. The drill locators are conventionally configured to be engaged by a drill tip and to straddle the web of the drill, thereby to rotate the latter to a predetermined relative angular position with respect to the engaged locator. The several locators are proportioned to receive drills of different predetermined web thickness. When positioning the collet 74 in the loading jig collet holder 320, the locating pin 268 on the collet engages in a locating groove 268a in the holder, whereby the collet is oriented in a fixed angular position in the holder. Cam mechanism 329 includes cams 329a and 329b rigid on a shaft 329c fixed to handle 328. Cam 329a engages a roller 329d on and offset from the pivot axis of yoke 326. Cam 329b engages a roller 329e on and offset from the pivot axis of arm 337, the latter being urged toward the cam by a spring 329f. Cams 329a, 329b are shaped to move the yoke 326 and turret arm 337 as follows: When handle 328 is swung in the clockwise direction in FIG. 1a, yoke 326 is swung to the right to release the collet assembly 300 and turret arm 337 is released to swing to the left under the action of its spring 329f. A drill is now inserted into the collet assembly and its tip is engaged with the proper locator. The drill is thereby oriented in a predetermined angular position in the collet. The handle 328 is now swung in the counterclockwise direction. During the initial portion of this handle movement, the turret arm 337 is swung to the right by its cam 329b, thereby pushing the drill to a predetermined axial position in the collet 74. At this time cam 329a reaches a position wherein it releases yoke 326 for left-hand swinging movement under the action of the collet spring, whereby the drill is gripped in the collet. Finally, the cam 329b again releases the turret arm 337 for left-hand swinging movement away from the drill. The collet with the drill therein may then be removed from the jig and inserted into the collet holder 250 in the drill holder 54, in the manner described earlier, in readiness for the drill pointing operation.

The drill locators 338 are so arranged that when a drill is located in the collet 74, as described above, it is properly angularly and axially positioned for drill pointing upon insertion of the collet into the drill holder and engagement of the collet locating pin 268 in its locating slot 266. In connection with the axial positioning of drills in the collet, attention is directed to the fact that the drill locators 338 progressively vary in length about the locator turret plate 336. Accordingly, drills are located in different axial positions in the collet 74 by the different locators. The reason for this is that the greater the web thickness of the drill, the greater must be the axial extension of the drill beyond the collet, as will be seen shortly. Thus, the axial length of the drill locators progressively decreases around the turret plate 336 toward the locator which is designed to receive the drill with the greatest web thickness.

Referring now to FIGS. 2, 3 and 4, it will be observed that the grinding wheel 48 turns on an axis 341 parallel to the axis 58 of oscillation and reciprocation of the drill holder 54 and located in a plane containing the drill axis 214. The shaft 342 of the grinding wheel is rotatably and axially supported in a bearing 344 which is mounted on a carriage plate 346. As may be best seen in FIG. 3, the carriage plate 346 has a dovetailed guideway which slidably receives a bevel-edged guide rail 348 bolted to the machine frame 32. The guide rail 348 extends in the fore and aft direction of the machine, whereby the grinding wheel 48 is slidably supported for fore and aft movement, toward and away from the drill holder 54. The handwheel 46 on the front side of the machine is keyed to a shaft 350, the forward end of which, i.e., the right-hand end of the shaft 350 as it is seen in FIG. 4, is threaded and engages in a nut plate 352 bolted to the rear edge of the carriage plate 346. Handwheel shaft 350 is rotatably supported intermediate its ends on the machine frame 32 by a combined radial and thrust bearing 354. It is evident, therefore, that the grinding wheel 48 may be adjusted toward and away from the drill holder 54 by turning the handwheel 46.

Mounted on the carriage plate 346 along with the grinding wheel 48 is a motor 356 for driving the wheel. The motor shaft is drivably coupled to the grinding wheel shaft by a belt drive 358. The mounting 360 for the motor is adjustable to adjust the drive belt tension. It is evident, therefore, that the grinding wheel and its drive motor are adjusted in unison by the handwheel 46.

As shown best in FIG. 8, the grinding wheel has a lower cylindrical, peripheral surface, parallel to the rotation axis 341 of the wheel, and an upper conical or beveled peripheral surface, inclined to the axis. This latter surface, which has been designated by the reference character S in the drawings, forms the actual grinding surface of the wheel. The grinding surface S intersects the top face of the grinding wheel along a circular edge E which is rounded to a small radius, as shown.

It will be recalled that the present drill pointing machine is designed to grind two different types of drill points, to wit, helical points and conical points. For reasons which appear shortly, the radius of the grinding edge E on the grinding wheel 48 must be smaller when grinding helical points than when grinding conical points. Also, the grinding surface S of the wheel must be periodically redressed. To this end, the machine includes a grinding wheel dresser 362 (FIG. 16). This dresser includes an arm 364, one end of which is mounted on the rear wall 366 of the grinding wheel enclosure 64 by a double axis hinge 368 which permits the arm to swing vertically about a horizontal axis 370 and horizontally about a vertical axis 372. The other end of the dresser arm 364 extends through an enlarged opening 374 in the side wall 376 of the enclosure 64 and is shaped to form a handle 378. On the side of the arm 364 facing the grinding wheel 48 is a tapered boss 380 in which is adjustably mounted a dressing tool 382. This dressing tool is located approximately on the centerline of the grinding wheel 48 and is inclined at approximately a 90° angle to the grinding surface S of the wheel at the latter centerline. The tool projects below the undersurface of the boss 380, as shown, for contact with the grinding surface S in the manner described below.

Adjustably mounted on the outer, or handle, end of the dresser arm 364 is a cam follower 384 which engages a cam 386 rotatably mounted on the enclosure side wall 376. Cam 386 includes a first peripheral cam surface 386a and a second peripheral cam surface 386b and may be rotated to bring either cam surface into operative engagement with the cam follower 384. A clamp 388 is provided for locking the cam in adjusted position.

The dresser 362 is used by adjusting the grinding wheel 48 to the right in FIG. 16 into engagement with the dressing tool 382 while the wheel is driven by its motor 356. The dresser arm 364 is then moved upwardly and to the left in such a way that the cam follower 384 rides along the cam surface 386a or 386b, as the case may be. During this movement of the arm, the dressing tool travels upwardly across the lower cylindrical surface of the grinding wheel, then upwardly across the beveled grinding surface S, and finally around the grinding edge E. The edge of the grinding wheel is thereby dressed to a contour matching the contour of the cam surface engaged by the cam follower. Cam surface 386a is shaped to dress the wheel, and particularly its grinding edge E, to the proper contour for grinding conical drill points. Cam surface 386b is shaped to dress the wheel to the proper contour for grinding helical drill points. In this connection, for example, see the larger radius of curvature of the rounded portion of cam surface 386a, which controls the radius of curvature of the wheel edge E when the latter cam surface is used, as compared to the radius of curvature of the rounded portion of cam surface 386b, which controls the radius of curvature of the edge E when the latter cam surface is used. In other words, cam surface 386a produces a wheel edge E of relatively large radius of curvature, as required for grinding conical drill points, while cam surface 386b produces a wheel edge E of relatively small radius of curvature, as required for grinding helical drill points.

This completes the structural description of the machine. The operation of the machine will now be considered.

The initial step in operating the machine involves loading a drill D into the collet 74 and inserting the collet into the drill holder 54 after the bushing turret 62 has been rotated to align the proper drill bushing 312 with the collet. The manner in which these steps are performed has already been explained. Let us assume first that a helical drill point is to be generated. In this case, the drill holder lock lever 226 is swung to its phantom line engaged or locking position of FIG. 12 wherein the drill holder 54 is locked against rocking on its axis 214 of oscillation. The angle of the drill axis 214 relative to the grinding surface S is now determined by the particular angular setting of the drill holder 54 relative to the rock arbor plate 192. As will be explained shortly, this angular setting of the drill holder is adjustable, by loosening the screws 234, 238 which lock the drill holder to the rock arbor plate, for the purpose of adjusting the tip angle of the drill. At this point, let us assume that the drill holder is set so that the drill axis 214 parallels the plane of the grinding wheel 48, as shown in FIG. 8.

The next step is to vertically adjust the drill support 52 so that the drill tip is properly vertically located relative to the grinding surface S of the grinding wheel 48. In this position, the drill axis approximately intersects the circular line of tangency of the grinding surface S and the rounded edge E, as in FIG. 8. The machine is now started by operating the controls 50 on the front of the machine. This energizes the drill support drive motor 84 and the grinding wheel drive motor 356.

The following discussion of helical drill pointing will deal first with the cyclic compound motion of the drill, that results from simultaneous oscillation and reciprocation of the drill support 52, by reference to FIGS. 17–20 wherein the drill is illustrated in various successive positions in one cycle of motion. The discussion will then deal with the actual helical grinding action by reference to FIGS. 21-23, which are end views of the drill tip corresponding to the drill positions of FIGS. 18-20, respectively.

Motor 84 simultaneously oscillates the drill support 52 about its vertical axis 58 and reciprocates the drill holder along this axis, and drives the collet 74, and thereby the drill D, in rotation on the drill axis 242, in the manner explained earlier. It is evident that oscillation of the drill support about the axis 58 oscillates the drill holder 54, and thereby the tip of the drill D, toward and away from the grinding wheel 48. Reciprocation of the drill support along the axis 58 reciprocates the drill holder and drill tip in a direction parallel to the axis 341 of the grinding wheel.

These oscillatory and reciprocatory motions of the drill support 52 ar so timed or synchronized, by proper shaping (see FIGS. 15a, 15b and 15c) and relative angular orientation of the cams 96, 98 and 100, that the tip of drill D undergoes the cyclic compound grinding motion illustrated in FIGS. 17-20. It is assumed that the grinding wheel 48 has been adjusted properly to effect contact of the drill tip with the grinding surface S as described. It should be noted here that during each cycle of motion of the drill, the drill tip moves from a position of initial contact with the grinding surface, across the latter, to a terminal grind position, and is then disengaged from the grinding surface and returned to its position of initial contact. The precise path of motion along which the drill is returned to its position of initial contact is not critical. Accordingly, the return path assumed in the following description should be regarded as merely illustrative.

Figure 17:
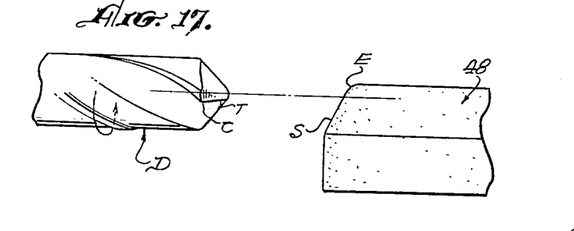
FIGS. 17–23 illustrate the grinding action of the machine when generating a helical drill point.

In accordance with the foregoing, and in order to facilitate the description, an initial position in the cycle of drill motion is assumed wherein the drill support 52 occupies the lower limit of its reciprocatory stroke along the axis 58 and the limit of its oscillatory stroke about the latter axis wherein the drill holder 54 is at its greatest distance from the grinding wheel 48. FIG. 17 illustrates the drill D in this initial position wherein the drill tip is axially spaced from the grinding surface. During the first part of the drill cycle, the drill support 52 is simultaneously rotated toward the grinding wheel and moved upwardly in such a way that the drill tip is moved axially forward toward the grinding surface S and slightly laterally upwardly toward the grinding edge E to the position of initial contact of the drill tip with the grinding surface S, shown in FIG. 18.

Figures 20, 23:
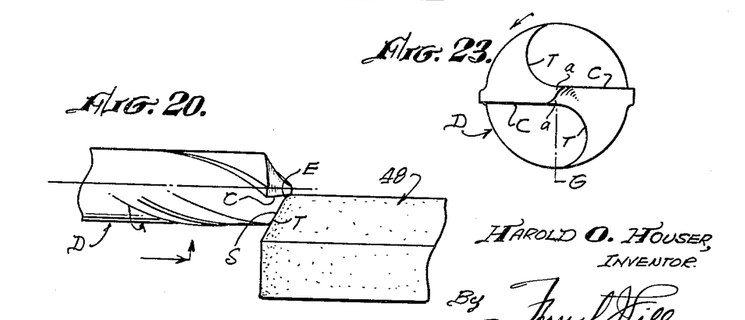

During the next part of the cycle, the drill support 52 continues to rotate toward the grinding surface and to elevate, whereby the drill tip continues to move axially forward toward the grinding surface and laterally upward toward the grinding edge, whereby the drill tip moves from its position of initial contact (FIG. 18), through an intermediate position (FIG. 19) to a terminal grind position (FIG. 20). When thus moving from the position of FIG. 18 to the position of FIG. 20, the drill tip is in contact with the grinding surface and travels across the grinding edge E, whereby the tip is ground or pointed, in the manner explained below.

It is to be noted here that since the grinding surface S is beveled, the axial and rotary motions of the drill support 52 could be so timed that the drill tip would move along a direction line parallel to the grinding surface. When grinding a helical drill point, as has been assumed in the present discussion, however, the rate at which the drill support is rotated toward the grinding wheel, and thereby the axial infeed of the drill tip toward the grinding surface, is slightly greater than that which would result in such parallel motion. Accordingly, the drill tip actually moves along a direction line which is inclined slightly toward the drill axis relative to the grinding surface. This results in grinding a relief angle on the drill, as will appear shortly.

During the final portion of the cycle of drill motion, the drill support 52 is rotated away from the grinding wheel and moved downwardly to retract the drill tip from the grinding wheel and return the drill to its initial position of FIG. 17, whereupon the above cycle of drill motion is repeated for the next land of the drill. As noted earlier, the precise path of motion followed by the drill from the terminal grind position of FIG. 20 back to the position of initial contact of the drill tip with the grinding surface (FIG. 18) is not critical.

Figure 21:
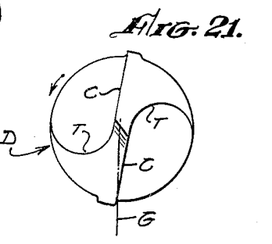
Figure 22:
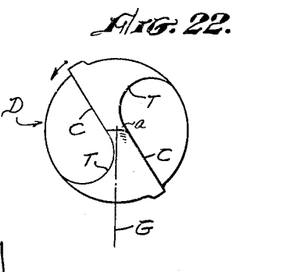

During the foregoing motion, the drill is also rotating on its axis, as illustrated in FIGS. 21-23. It is evident from the earlier description that rotation of the drill is timed or synchronized with the compound axial and lateral drill motion. In FIGS. 21-23, the reference character C denotes the leading or cutting edge of each drill land, the reference character T denotes the trailing edge of each land, and the dotted line G represents the effective line contact between the grinding surface S and the engaged drill land.

The rotational motion of the drill D is so timed that in its position of initial contact (FIGS. 18, 23), the leading edge C of the engaged drill land is located approximately in a plane containing the axis 341 of the grinding wheel, whereby the line of contact G of the grinding surface S with the land approximately coincides with the leading edge of the land, as shown. The leading edge of the land is thereby ground at an angle (tip angle) to the drill axis determined by the angle between the drill axis and the grinding surface. As the drill tip moves upwardly across the grinding surface, through the position of FIGS. 19, 22, the drill continues to rotate. As a result, the line G of contact of the grinding surface with the drill land, in effect, undergoes relative rotation with respect to the drill about the drill axis and toward the trailing edge T of the land, as is evident from FIG. 22. The land surface is thereby progressively ground toward its trailing edge.

It will be recalled that the axial infeed of the drill during its movement across the grinding surface occurs at a slightly greater rate than that which would result in movement of the drill tip parallel to the grinding surface. As a result, the effective depth of cut of the grinding surface into the engaged land surface of the drill progressively increases as the line G of contact of the grinding surface with the land surface effectively rotates toward the trailing edge of the land during travel of the rotating drill tip across the grinding surface from the position of FIGS. 18, 21, through the position of FIGS. 19, 22, to the position of FIGS. 20, 23. It is evident that the tip surface thus generated or ground on the engaged land is characterized by the fact that all line elements on the surface which intersect the drill axis are inclined at the same angle (tip angle) to the drill axis and by the further fact that the points of intersection of the drill axis and the successive line elements, in the direction of the trailing edge of the engaged land, recede rearwardly along the drill axis. In other words, the tip surface generated by the aforedescribed movement of the rotating drill tip across the grinding surface S is a generally helical surface.

As the drill tip approaches the terminal grind position of FIGS. 20, 23, the relatively rotating line G of contact of the grinding surface S with the engaged land surface of the drill approaches the outer, rearwardmost extremity of the trailing edge T of the land, whereby the major contact of the grinding wheel with the drill occurs between the grinding edge E and the area a (FIG. 23) of the drill tip immediately adjacent the drill axis. During this final contact of the drill tip with the grinding edge E, the drill tip is undercut slightly in the area a.

Figure 18:
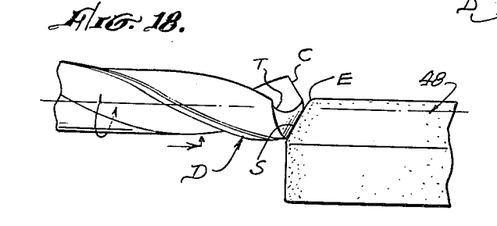
Figure 19:
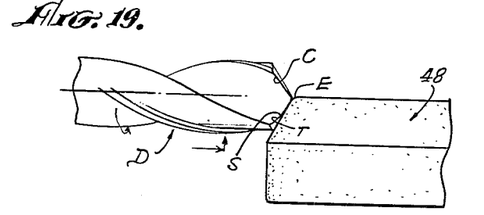

The axial, lateral, and rotational motions of the drill are so timed that during return of the drill from the terminal grind position of FIGS. 20, 23, through the initial cycle position of FIG. 17, to the position of initial contact of FIGS. 18, 21, the leading edge C of the following land of the drill is rotated to the position of FIG. 21. The tip surface of this land is then ground in precisely the same way as described above. Thus, the tip surfaces of the drill lands are successively ground and reground until the drill tip is properly pointed. The drill point configuration which is thereby generated is commonly referred to as a helical point and has a slightly curved, but relatively sharp centering point, as shown.

The resulting tip angle of the drill is determined by the angle between the drill axis and the grinding surface S. This tip angle may be varied by loosening the drill holder lock screws 234, 238 and adjusting the angle of the drill holder 54 in the manner explained earlier, thereby to change the angle between the drill axis and the grinding surface S.

Let us assume now that a conical drill point is to be ground. In this case, the drill is placed in the machine in precisely the same way as described before, and the grinding wheel 48 is dressed, in the manner explained earlier, to provide the wheel edge E with the proper larger radius of curvature for conical pointing. The drill holder lock lever 226 is then rotated from its phantom line engaged position to its solid line released position of FIG. 12. This releases the drill holder for rocking or oscillatory motion about the rock axis 214 under the action of cam 96 and push rod 112. When the machine is now started, the drill support 52 and the drill holder 54 thereon are reciprocated and oscillated on the axis 58 and the drill is rotated in the drill holder, all in timed relation as described above. In addition, the drill holder 54 and the drill therein are now rocked or oscillated about the axis 214 in timed relation to the other motions just mentioned. These several motions produce the conical grinding action now to be described.

Figure 24:
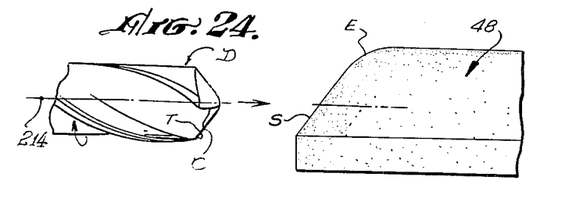
FIGS. 24–30 illustrate the grinding action of the machine when generating a conical drill point.
Figure 25:
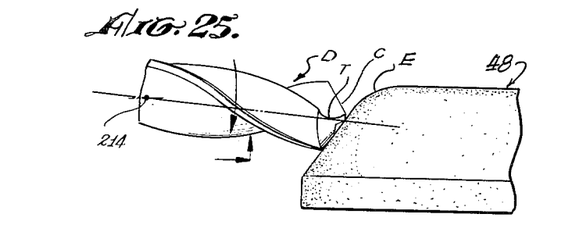
Figure 28:
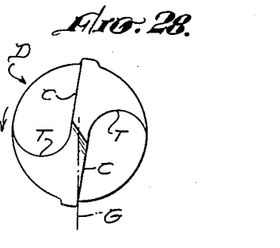

FIG. 24 illustrates the drill D at an initial position in the conical grinding cycle. In this position, the drill axis is about horizontal, the drill support 52 is about at the lower limit of its reciprocatory stroke, and the drill tip is spaced from the grinding surface S. During the first part of the grinding cycle, the drill support 52 is simultaneously rotated toward the grinding wheel and moved upwardly and the drill tip is rotated downwardly about the drill holder rocking axis 214 in such a way that the drill tip is moved to the position of initial contact, shown in FIGS. 25 and 28. In this position, the leading or cutting edge C of one drill land approximately parallels the rotation axis 341 of the grinding wheel, whereby the line of contact G of the grinding surface with the drill tip approximately coincides with the leading edge C and the latter is ground at an angle to the drill axis, as before.

Figure 26:
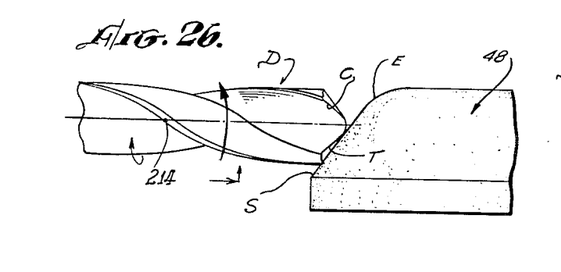
Figure 27:
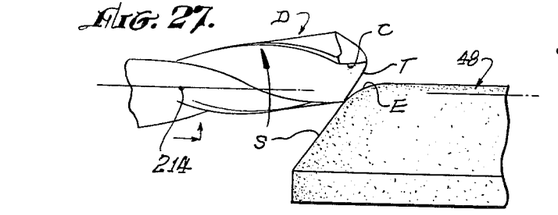
Figure 29:
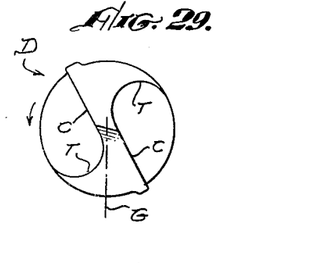
Figure 30:
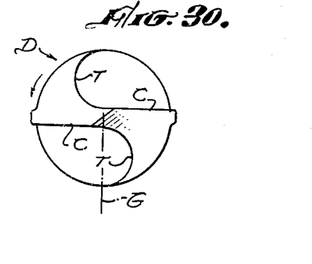

During the next part of the cycle, the drill support 52 continues to rotate toward the grinding surface and to elevate, and the drill tip commences to rotate upwardly about the rocking axis 214, whereby the drill tip moves from its position of initial contact (FIGS. 25, 28), through the intermediate position of FIGS. 26, 29, to the terminal grinding position of FIGS. 27, 30. The drill, of course, continues to rotate during and in synchronism with the above motions, whereby the drill tip travels upwardly along the grinding surface S toward and finally across the grinding edge E. As the drill tip thus travels upwardly across the grinding surface, the line of contact G of the grinding surface with the drill tip undergoes relative rotation toward the trailing edge T of the currently engaged drill land and the angle between the drill axis and the grinding surface progressively changes, in the manner illustrated in the drawings.

During the above drill motions, the rate of infeed of the drill toward the grinding source S, resulting from rotation of the drill support 52 toward the grinding wheel, is slightly greater than that which causes the point of intersection of the drill axis and its rocking axis 214 to parallel the grinding surface. This is true since the same cams 96 and 98 are used for oscillating and reciprocating the drill support 52 as in the helical drill grinding described earlier. The radius of curvature of the grinding edge E and the rate of rocking motion of the drill about its rocking axis 214 during the conical drill grinding operation under discussion are such, however, that the land tip surface which is ground on the drill during its movement from the initial position of FIGS. 25, 28, through the intermediate position of FIGS. 26, 29, to the terminal grind position of FIGS. 27, 30 is characterized by the fact that all radial line elements on the land tip surface, from its leading edge C to the rearmost extremity of its trailing edge T intersect the drill axis at substantially a common point. This tip surface, then, is approximately conical. Owing to the change in the angle between the drill axis and the grinding surface S, occasioned by rocking of the drill on its rocking axis 214, the generally conical tip surface of the land which is thus ground is provided with the proper relief angle.

Upon reaching the terminal grind position of FIGS. 27, 30, the drill support 52 commences to rotate away from the grinding wheel and to descent, and the drill tip is rotated downwardly about its rocking axis 214 to return the drill through its initial position of FIG. 24 to its position of initial contact with the grinding surface S. During this return motion of the drill, the latter is rotated on its axis in such manner as to bring the leading or cutting edge C of the next land of the drill into the position of FIG. 28. The above grinding cycle is then repeated for the latter land of the drill. This grinding action is repeated until the drill tip is properly ground. The resulting drill tip is referred to as a conical drill tip. When grinding such a conical tip, the greater the web thickness of the drill, the greater must be the distance between the drill tip and the rocking axis 214 of the drill to assure grinding of the entire land tip surfaces of the drill. It is for this reason that the drill locators 338 embodied in the drill loading jig 72 locate different sized drills in different axial positions in the drill collet 74, as explained earlier.

Numerous modifications in the design, arrangement of parts, an instrumentalities of the invention are possible within the spirit and scope of the following claims.

I claim:
1. A drill pointing machine comprising:
   a main frame,
   a drill holder,
   means mounting said drill holder on said frame,
   a rotary grinding wheel having a grinding surface,
   means mounting said grinding wheel on said frame,
   one of said mounting means comprising a support
      mounted on said frame for timed movement along predetermined direction lines, whereby the tip of a drill in said holder and said grinding wheel undergo relative cyclic movement in such manner that the relative movement of said drill tip with respect to the grinding wheel occurs along a closed path and the drill tip engages said grinding surface with the drill axis inclined at an angle to the surface during relative movement of the drill tip between two positions spaced along said path,
   a motor carried directly on said support for movement with the latter,
   means on said support driven by said motor and coacting between said frame and support for imparting said timed movement to the support along said direction lines, and
   means for rotating the drill in said holder in timed relation to said timed movement of the support.
2. The subject matter of claim 1 wherein:
   said support comprises the mounting means for said drill holder.
3. In a drill pointing machine, the combination comprising:
   a main frame,
   a drill support mounted on said frame for oscillation about and reciprocation along a given axis of the frame,
   said drill support including a drill holder for positioning a drill to be pointed with its axis laterally offset from and extending transversely of said given axis, a motor carried directly on said support for oscillation and reciprocation with the latter, and means on said support driven by said motor and co-acting between said frame and support for oscillating and reciprocating said support in timed relation.

4. The subject matter of claim 3 wherein:

said driven means includes means engaging a member on said frame and operable to react against said member to impart movement to said drill support along said given axis during operation of said motor, and means for adjusting said member in the direction of said given axis, thereby to adjust said drill support in the direction of said given axis.

5. The subject matter of claim 3 including:

means driven by said motor for rotating the drill in said holder in timed relation to said timed oscillation and reciprocation of said support.

6. The subject matter of claim 3 including:

means mounting said drill holder on said support for rocking motion about a rocking axis transverse to both said given axis and said drill axis, thereby to vary the angle between said drill axis and a plane normal to said given axis, and means driven by said motor for rocking said drill holder on said rocking axis in timed relation to said timed oscillation and reciprocation of said support.

7. The subject matter of claim 6 including:

means for selectively inactivating said rocking means and locking said drill holder to said support with the drill axis inclined at a predetermined angle to said normal plane.

8. In a drill pointing machine, the combination comprising:

a main frame structure, a drill supporting structure mounted on said frame structure for independent movement along two angularly related direction lines and including a drill holder for positioning a drill with its axis extending substantially in the direction of one of said direction lines, a motor mounted directly on one of said structures, first means driven by said motor for oscillating said drill supporting structure in the direction of one of said direction lines, second means driven by said motor for oscillating said drill supporting structure in the direction of the other direction line, at least one of said first and second means comprising an arm hinged on one of said structures and engaging a fulcrum on the other structure in such manner that rocking of said arm against said fulcrum moves said drill supporting structure in one direction along one of said direction lines, a cam driven by said motor and engaging said arm to rock the latter toward said fulcrum, and means for urging said drill supporting structure in the opposite direction along said one direction line, and means for selectively relatively adjusting said arm and fulcrum in the longitudinal direction of the arm, thereby to vary the oscillation stroke of said drill supporting structure along said one direction line.

9. The subject matter of claim 8 wherein:

said drill supporting structure is mounted on said frame structure for oscillation about a given axis of the frame structure and reciprocation along said latter axis, whereby one of said direction lines is linear and extends along said given axis and the other direction line is circular and centered on said given axis, and said drill holder positions the drill to be pointed with the drill axis laterally offset from and extending transversely of said given axis.

10. The subject matter of claim 8 wherein:

said motor, arm, and cam are carried on said drill supporting structure and said fulcrum is mounted on said frame structure.

11. The subject matter of claim 8 wherein:

said motor, arms, and cams are carried on said drill supporting structure and said fulcrums are mounted on said frame structure.

12. In a drill pointing machine, the combination comprising:

a main frame structure, a drill supporting structure mounted on said frame structure for independent movement along two angularly related direction lines and including a drill holder for positioning a drill with its axis extending substantially in the direction of one of said direction lines, a motor mounted directly on one of said structures, first means driven by said motor for oscillating said drill supporting structure in the direction of one of said direction lines, second means driven by said motor for oscillating said drill supporting structure in the direction of the other direction line, each of said first and second means comprising an arm hinged on one of said structures and engaging a fulcrum on the other structure in such manner that rocking of one arm against its respective fulcrum moves said drill supporting structure in one direction along one of said direction lines and rocking of the other arm against its respective fulcrum moves said drill supporting structure in one direction along the other direction line, a pair of cams driven in timed relation by said motor and engaging said arms, respectively, to rock the latter toward their respective fulcrums, and means for urging said drill supporting structure in the opposite directions along said direction lines, and means for relatively adjusting each arm and its respective fulcrum in the longitudinal direction of the respective arm, thereby to vary the oscillatory stroke of said drill supporting structure along the respective direction line.

13. The subject matter of claim 12 wherein:

said drill supporting structure is mounted on said frame structure for oscillation about a given axis of the frame structure and reciprocation along said latter axis, whereby one of said direction lines is linear and extends along said given axis and the other direction line is circular and centered on said given axis, and said drill holder positions the drill to be pointed with the drill axis laterally offset from and extending transversely of said given axis.

14. In a drill pointing machine, the combination comprising:

a main frame, a drill support mounted on said frame for oscillation about and reciprocation along a given axis of the frame, said drill support including a drill holder for positioning a drill to be pointed with its axis laterally offset from and extending transversely of said given axis and means mounting said drill holder on the drill support for rocking motion about a rocking axis transverse to both said given axis and said drill axis, thereby to vary the angle between said drill axis and a plane normal to said given axis, and means for oscillating and reciprocating said drill support on said given axis, rocking said drill holder on said rocking axis, and rotating said drill in timed relation including a motor and rocking means driven by said motor and operatively connected to said drill holder to rock the latter about said rocking axis.

15. In a drill pointing machine, the combination comprising:
   a main frame,
   a drill support including a tubular shaft and a drill holder on one end of the shaft for positioning a drill to be pointed with the drill axis laterally offset from and extending transversely of the axis of the shaft,
   means mounting said shaft on said frame for oscillation of the drill support about and reciprocation of the drill support along said shaft axis,
   a motor carried directly by said shaft, and
   means on said shaft driven by said motor and coacting between said frame and drill support for oscillating and reciprocating the latter in timed relation on said shaft axis.

16. The subject matter of claim 15 wherein:
   said driven means includes a first arm extending transversely of said shaft and pivoted on a transverse axis of the shaft, a fulcrum on said frame engaging said arm, whereby pivoting of the arm moves said support in one direction along said shaft axis, a rotary cam on said shaft driven by said motor and engaging said arm to pivot the latter toward said fulcrum, means for urging the drill support in the opposite direction along said shaft axis, a second arm extending generally longitudinally of said shaft and pivoted on a transverse axis of the shaft, a second fulcrum on said frame engaging said second arm, whereby pivoting of the latter toward said second fulcrum swings said drill support in one direction on said shaft axis, a second rotary cam on said shaft engaging said second arm for pivoting the latter toward said second fulcrum, and means for urging said drill support in the opposite direction about said shaft axis.

17. The subject matter of claim 16 wherein:
   said shaft axis is vertical, whereby said first fulcrum supports said drill support in the vertical direction.

18. The subject matter of claim 15 wherein:
   said driven means includes a first arm extending transversely of said shaft and pivoted on a transverse axis of the shaft, a fulcrum on said frame engaging said arm, whereby pivoting of the arm moves said support in one direction along said shaft axis, a rotary cam on said shaft driven by said motor and engaging said arm to pivot the latter toward said fulcrum, means for urging the drill support in the opposite direction along said shaft axis, a second arm extending generally longitudinally of said shaft and pivoted on a transverse axis of the shaft, a second fulcrum on said frame engaging said second arm, whereby pivoting of the latter toward said second fulcrum swings said drill support in one direction on said shaft axis, a second rotary cam on said shaft engaging said second arm for pivoting the latter toward said second fulcrum, and means for urging said drill support in the opposite direction about said shaft axis, and
   means for adjusting each fulcrum lengthwise of its respective arm, thereby to vary the oscillatory and reciprocatory strokes of said drill support.

19. The subject matter of claim 15 including:
   means driven by said motor for rotating the drill on its axis in timed relation to reciprocation and oscillation of the drill support.

20. The subject matter of claim 15 including:
   means mounting said drill holder on said shaft for rocking about a rocking axis transverse to both the shaft axis and drill axis, thereby to vary the angle between the drill axis and a plane normal to the shaft axis, and
   means driven by said motor for rocking said drill holder on said rocking axis in timed relation to said timed reciprocation and oscillation of the drill support on said shaft axis.

21. The subject matter of claim 20 wherein:
   said last-mentioned means comprises a rotary cam driven by said motor, a push rod engaging said cam and extending axially through said shaft, means operatively connecting said push rod and drill holder, whereby axial movement of the push rod in one direction by said cam rocks said drill holder in one direction on said rocking axis, and means urging said drill holder in the opposite direction on said rocking axis.

22. In a drill pointing machine, the combination comprising:
   a main frame,
   a drill support including a tubular shaft, a drill holder for positioning a drill to be pointed with the drill axis laterally displaced from and extending transversely of the axis of said shaft, and means mounting said drill holder on said shaft for rocking movement about a rocking axis normal to and intersecting said shaft axis and said drill axis,
   means supporting said shaft on said frame with the shaft axis vertical and for oscillation of said drill support about and reciprocation of said drill support along said shaft axis,
   a motor mounted on the lower end of said shaft,
   a first arm extending transversely of said shaft and pivoted on a transverse axis of the shaft, a fulcrum on said frame engaging said arm, whereby pivoting of the arm moves said support in one direction along said shaft axis, a rotary cam on said shaft driven by said motor and engaging said arm to pivot the latter toward said fulcrum, means for urging the drill support in the opposite direction along said shaft axis, a second arm extending generally longitudinally of said shaft and pivoted on a transverse axis of the shaft, a second fulcrum on said frame engaging said second arm, whereby pivoting of the latter toward said second fulcrum swings said drill support in one direction on said shaft axis, a second rotary cam on said shaft engaging said second arm for pivoting the latter toward said second fulcrum, and means for urging said drill support in the opposite direction about said shaft axis,
   means for selectively adjusting each fulcrum along its respective arm, thereby to vary the reciprocatory and oscillatory strokes of said drill support,
   means for selectively vertically adjusting said first fulcrum, thereby to adjust the vertical position of said drill support,
   means driven by said motor for rotating said drill on its axis in timed relation to reciprocation and oscillation of the drill support on said shaft axis,
   means driven by said motor for rocking said drill holder on said rocking axis in timed relation to reciprocation and oscillation of said drill support on said shaft axis, and
   means for selectively locking said drill holder to said shaft in a fixed angular position on said rocking axis.

23. In a drill pointing machine, the combination comprising:
   a main frame,
   a rotary grinding wheel on said frame,
   a drill holder on said frame,
   means for moving said drill holder in time relation along predetermined direction lines, thereby to move the tip of a drill in the holder along a closed path such that the drill tip moves through a series of successive positions of grinding contact with said wheel, and
   said drill holder including a rotary collet holder, means for rotating said collet holder in timed relation to movement of the drill holder along said direction lines, a drill collet insertable into said collet holder including means for gripping the drill and positioning the latter on the rotation axis of the collet holder, and means releasably securing said collet in predetermined angular position in said collet holder.

24. The subject matter of claim 23 including:
a loading jig to receive said collet comprising means to selectively release the collet to permit insertion of a drill into and removal of the drill from said collet, means for locating said collet in a predetermined angular position and a predetermined axial position in said jig, and a drill locator disposed for engagement with the tip of a drill in the collet for locating the drill in a predetermined angular position and a predetermined axial position in the collet prior to release of the latter to grip the drill.

References Cited by the Examiner

UNITED STATES PATENTS 3,040,480  6/62  Winslow et al. ---------- 51—94
3,067,548  12/62  Winslow et al. ---------- 51—94

LESTER M. SWINGLE, *Primary Examiner.*